United States Patent
Ko et al.

(10) Patent No.: US 7,742,106 B2
(45) Date of Patent: Jun. 22, 2010

(54) METHOD AND APPARATUS FOR SETTING LANGUAGE IN TELEVISION RECEIVER

(75) Inventors: Myoung Hwa Ko, Gumi-si (KR); Kyong Soo Hwang, Daegu (KR); Su Zin Lee, Daegu (KR); Sim Hong Lee, Daegu (KR); Jae Hyun Park, Daegu (KR); Hee Tae Yoo, Daegu (KR); Hong Ki Kim, Daegu (KR); Eun Hyung Cho, Gumi-si (KR)

(73) Assignee: LG Electronics Inc., Seoul (KR)

( * ) Notice: Subject to any disclaimer, the term of this patent is extended or adjusted under 35 U.S.C. 154(b) by 1088 days.

(21) Appl. No.: 11/412,189

(22) Filed: Apr. 27, 2006

(65) Prior Publication Data

US 2007/0211168 A1  Sep. 13, 2007

(30) Foreign Application Priority Data

Mar. 6, 2006 (KR) .................. 10-2006-0021076

(51) Int. Cl.
   *H04N 5/50* (2006.01)
(52) U.S. Cl. .................. 348/569; 715/716
(58) Field of Classification Search .............. 348/569, 348/570, 552, 553, 554, 461, 468; 725/135–139, 725/39; 715/841, 845, 716–726
   See application file for complete search history.

(56) References Cited

U.S. PATENT DOCUMENTS 6,204,885 B1 * 3/2001 Kwoh .................. 348/564

(Continued)

FOREIGN PATENT DOCUMENTS

KR  10-2002-0029844 A  4/2002

(Continued)

OTHER PUBLICATIONS

European Search Report dated Jan. 16, 2009.

(Continued)

*Primary Examiner*—M. Lee
(74) *Attorney, Agent, or Firm*—KED & Associates, LLP

(57) ABSTRACT

A method and apparatus for setting a language in a television receiver enable one language setting operation performed in a first menu, corresponding to one of a plurality of language-specific functions, to automatically set a preferred language for one or more other functions. The method includes steps of setting a language in a first menu according to a user selection, the first menu corresponding to one function of a plurality of language-specific functions; and automatically setting a language of at least one other function of the plurality of language-specific functions to the language set according to the user selection, the language of the at least one other function being set interoperably with the first menu. Thus, if at least one language is selected in the first menu, a language of at least one other function is set to the first-menu language. Upon powering a television receiver receiving a transport stream from a broadcasting station, a tuner tunes a broadcast signal of a corresponding channel, whereupon additional information is parsed from the tuned transport stream to extract information of every language being provided. The extracted information is then stored in memory so that, according to a user selection of a first menu for performing a language setting operation, the stored language information can be simultaneously output as an audio signal and displayed on a screen to enable user recognition.

30 Claims, 13 Drawing Sheets

U.S. PATENT DOCUMENTS

| | | | |
|---|---|---|---|
| 6,661,466 B1 | 12/2003 | Kou | 348/553 |
| 7,051,360 B1* | 5/2006 | Ellis et al. | 725/136 |
| 7,328,409 B2* | 2/2008 | Awada et al. | 715/765 |
| 7,515,212 B2* | 4/2009 | Katayama | 348/738 |
| 2002/0044222 A1 | 4/2002 | Lee | 348/564 |
| 2002/0083453 A1 | 6/2002 | Menez | 725/47 |
| 2002/0186328 A1* | 12/2002 | Nishida et al. | 348/738 |
| 2005/0285980 A1 | 12/2005 | Katayama | 348/738 |

FOREIGN PATENT DOCUMENTS

| | | |
|---|---|---|
| KR | 10-2003-0016602 A | 3/2003 |
| WO | WO 01/06788 A1 | 1/2001 |
| WO | WO 2004/098180 A1 | 11/2004 |

OTHER PUBLICATIONS

Korean Office Action dated Jan. 31, 2007.
Chinese Office Action dated Sep. 12, 2008.

* cited by examiner

FIG. 6

| LANGUAGE | 1st | English |
| --- | --- | --- |
| SETUP | 2nd | French |
| | 3rd | Spanish |
| VIDEO | | |
| AUDIO | ☑ | Full function set |
| | ☐ | OSD language set |
| TIME | ☐ | Audio language set |
| | ☐ | Caption language set |
| OPTION | | |
| LOCK | | |
| CABLE | | |

METHOD AND APPARATUS FOR SETTING LANGUAGE IN TELEVISION RECEIVER

This application claims the benefit of Korean Patent Application No. 10-2006-0021076, filed on Mar. 6, 2006, which is hereby incorporated by reference as if fully set forth herein.

BACKGROUND OF THE INVENTION

1. Field of the Invention

The present invention relates to a method and apparatus for setting a language in a television receiver.

2. Discussion of the Related Art

Digital video standardizations, for example, those promoted by the Moving Picture Experts Group (MPEG), have led to a proliferation of digital video transmission and reception systems manufactured and used in numerous countries and have even enabled commercial broadcasts and related testing via satellite, terrestrial waves, cable connections, and other mediums in an ever increasing manner. Using conventional "one-way" broadcasting technology, digital broadcasting stations now offer various information and interactive television services. The bandwidth allotted for a satellite broadcast program, for example, can be assigned to carry the broadcast program and control information on a major bandwidth portion, with the remaining bandwidth utilized as an additional information channel for information associated with the broadcast program.

In addition to a main video component, a single transport stream of digital television broadcasting may be made up of a plurality of audio components associated with the transported video signal. Thus, the transport stream includes one video signal and more than one audio signal, and each audio signal may convey a specific language, enabling the viewing of a broadcast program while listening to a desired language, which is selected by the user. Using multi-sound broadcasting technology, a set of languages may be transmitted according to the country or countries of a specific broadcast region. At the same time, multiple formats may be available to enable language-specific functions such as on-screen display (OSD) menus and captioning in the selected language.

For example, a set of languages may be assigned to a television receiver enabling one language to be selected from among several languages, such that a default language is used in a corresponding menu. If a broadcasting station includes the selected language in its transport stream, the television receiver outputs the audio signal of the selected language, and the same language is used for OSD menus. If the selected language is unavailable, a service allocation descriptor is used to set the language of the output audio and menus based on a priority ranking of the available languages. In other words, in a contemporary system, a search of the actual data stream being broadcast via a tuned broadcast channel cannot be performed using, for example, a displayed menu to identify a desired language, and rather than enabling such a search, the system merely allows the selection of one language from among a default set of popular languages. The television receiver of the contemporary system then searches the transport stream according to a system program to determine whether the selected language is included and can be made available.

Therefore, there is a serious impediment to language selection in the event that a desired language is not among the default set of popular languages but is being transmitted by the broadcast station. That is, the transport stream may include the audio component of the desired language, but there may be no corresponding display in the language selection menu, thereby precluding its selection by the user, who is likely to possess incomplete knowledge of the language availability of each of several transport streams by the various broadcast stations in a country or region. Moreover, with no analysis of the transport stream enabled, there is no possibility for a timely display or intelligible representation (e.g., to a user or microprocessor) of the multiple formats that may be available for OSD menus and captioning. As a result, the user of the contemporary system may be forced to view and listen to a broadcast program according to language settings as determined by the service allocation descriptor. Further inconvenience results since the user must perform a separate language setting process for each of a variety of language-specific menus, such as an OSD function menu, an audio function menu, or a caption function menu that may be available in a general television receiver.

SUMMARY OF THE INVENTION

Accordingly, the present invention is directed to a method and apparatus for setting a language in a television receiver that substantially obviates one or more problems due to limitations and disadvantages of the related art.

An object of the present invention is to provide a method and apparatus for setting a language in a television receiver having a plurality of language-specific functions, by which a language setting operation can be simply and conveniently performed for any number of the language-specific functions.

Another object of the present invention is to provide a method and apparatus for setting a language in a television receiver, which enables a language setting for at least language-specific function to be performed according to user preference without detailed knowledge of a current data stream.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a method of setting languages in a television receiver. The method comprises setting a language in a first menu according to a user selection, the first menu corresponding to one function of a plurality of language-specific functions; and automatically setting a language of at least one other function of the plurality of language-specific functions to the language set according to the user selection. The method may, according to another embodiment, comprise setting at least two languages in a first menu according to a user selection, the first menu corresponding to one function of a plurality of language-specific functions, the setting of at least two languages designating a priority of each of the at least two languages; and automatically setting a language of at least one other function of the plurality of language-specific functions to the language set according to the user selection.

According to another aspect of the present invention, there is provided an apparatus for setting languages in a television receiver. The apparatus comprises a key signal input unit for generating, according to a user selection, a key signal for a menu selection and a language selection; a display unit for generating, in response to the key signal, screen images for the menu selection and the language selection; and a controller for automatically setting, if a language in a first menu corresponding to one function of a plurality of language-specific functions is set by the user selection, a language of at least one other function of the plurality of language-specific functions to the language set by the user selection, the language of the at least one other function being set interoperably with the first menu.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram of a screen image displayed by the display unit of FIG. 1, for setting languages according to the second embodiment;

DETAILED DESCRIPTION OF THE INVENTION

Reference will now be made in detail to exemplary embodiments of the present invention, examples of which are illustrated in the accompanying drawings. Wherever possible, like reference designations will be used throughout the drawings to refer to the same or similar parts.

Figure 1:
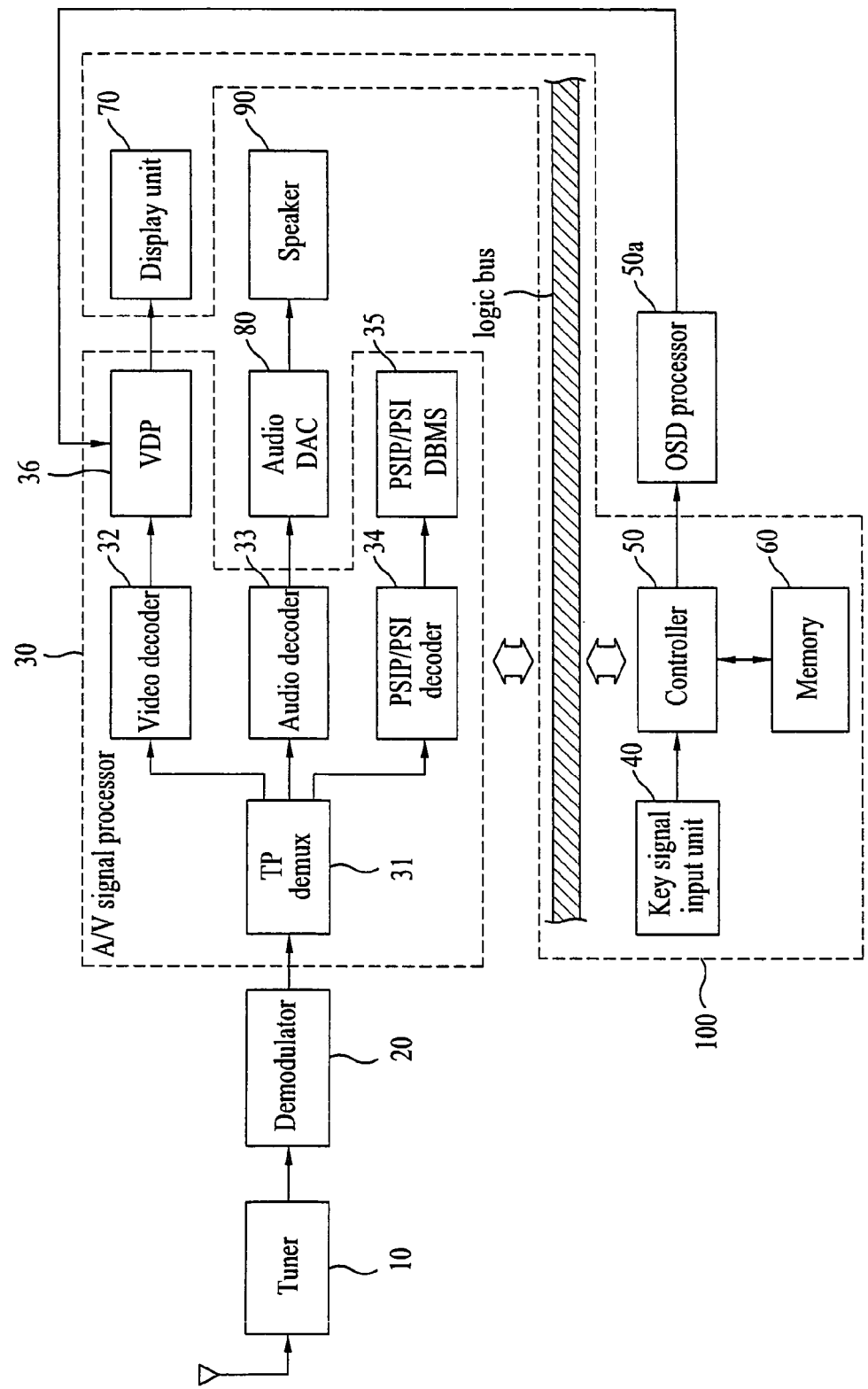
FIG. 1 is a block diagram of a digital television receiver according to the present invention.

Referring to FIG. 1, a digital television receiver according to the present invention comprises a tuner 10 for receiving a digital broadcast signal in a data stream format; a demodulator 20 for demodulating the received broadcast signal; an audio/video (A/V) signal processor 30 for outputting audio and video signals by respectively decoding extracted data; a key signal input unit 40 for enabling a key signal input according to a user selection; a controller 50, using an internal memory 60, for controlling the entire system via a logic bus according to user selections made via the key signal input unit; and a display unit 70 for displaying screen images under the control of the controller. The A/V signal processor 30 has a video display processor (VDP) 36 for converting a decoded video signal into a predetermined output format while superposing an on-screen display (OSD) signal from an OSD processor 50a under the control of the controller 50. An audio digital-to-analog converter (DAC) 80 and a speaker 90 are provided for converting the decoded audio signal into a sound signal.

The A/V signal processor 30 comprises a transport packet (TP) demultiplexer 31 for extracting audio data, video data, and additional data from the broadcast signal output by the demodulator 20 and respectively outputting data streams of the extracted data; a video decoder 32 for decoding the extracted video data; an audio decoder 33 for decoding the extracted audio data; and a PSIP/PSI decoder 34, using a PSIP/PSI database management system (DBMS) 35, for decoding the extracted additional data. The additional data may be program system information protocol (PSIP) or program specific information (PSI) provided in a data stream of a digital television broadcasting system to supply viewers with detailed programming information for each broadcast channel, where PSIP information corresponds to a North American system and PSI information corresponds to a European system. When tuned to a broadcast channel, a general digital television receiver respectively extracts the audio, video, and additional data by parsing the PSIP/PSI information included in the data stream.

A transport stream according to a digital television broadcasting system is constructed with packets, each having a prescribed number of bytes. Each packet is provided with a unique packet identifier, so that the information loaded into a corresponding packet can be identified according to content type, such as an audio channel, a video channel, or a data channel, which may include PSIP/PSI information associated with specific audio and video packets. The contents of packetized audio and video information can be recognized (detected) by providing (broadcasting) PSIP information, which may include a variety of tables, for example, a master guide table, a terrestrial virtual channel table, a rating region table, an extended text table, and a system time table.

The PSIP information also includes an event information table or EIT, which may comprise a broadcast guide made up of EIT information such as a program identifier, start time, broadcast duration, program rating, video type, and multisound broadcasting data. The EIT information is transmitted from a broadcasting station, and the received EIT information is decoded by a television receiver for output via the display unit of the television receiver. Thus, a broadcast guide can be displayed according to a unique format determined by each television receiver manufacturer. That is, the EIT information includes a set of descriptors, one of which may be a service allocation descriptor such as that shown in Table 1.

TABLE 1

| syntax | bit length | format |
|---|---|---|
| service_location_descriptor ( ) { | | |
|     descriptor_tag | 8 bits | 0xA1 |
|     descriptor_length | 8 bits | uimsbf |
|     reserved | 3 bits | '111' |
|     PCR_PID | 13 bits | uimsbf |
|     num_elements | 3 bits | uimsbf |
|     for (i = 0; i < num_elements; i++) { | | |
|         stream_type | 8 bits | uimsbf |
|         reserved | 3 bits | '111' |
|         elementary_PID | 13 bits | uimsbf |
|         ISO_639_language_code | 8*3 bits | uimsbf |
|     } | | |
| } | | |

Referring to Table 1, detailing an exemplary syntax of a service allocation descriptor of the EIT information broadcast with the PSIP information for detecting the packets of audio and video information, the notation "num_elements" indicates the total number of elements included in the transport stream, namely, the audio components, the video component, and any additional data components. The num_elements loop sets a stream_type for identifying the streams of audio, video, etc.; an elementary_PID for identifying the packets; and an ISO_639_language_code for indicating the language of an audio stream. Since a plurality of audio signals can be included in a transport stream having one video signal, a user can select a specific language corresponding to one among various audio signals of a multi-sound broadcasting signal. The selectable languages may correspond to preferred languages of a region including one or more countries and can be a specially configured set of languages classified according to a targeted audience of a specific program.

The digital television receiver of FIG. 1 comprises a language setting apparatus 100 for selectively controlling the respective settings of a plurality of language-specific functions. To implement the language setting apparatus of the present invention, the key signal input unit 40 generates and inputs to the controller 50 a key signal indicative of a user selection of a menu corresponding to a function and a language corresponding to the menu. That is, the user selection determines each of a menu selection and a language selection. Here, it should be appreciated that the key signal input unit 40 may be embodied by a remote controller (not shown) for transmitting the key signal to a corresponding receiver unit (not shown) installed in a main unit (not shown) of the television receiver. Under the control of the controller 50 via the logic bus, the display unit 70 generates screen images for the respective menus, their language selections, and an interoperable function selector. When at least one language of a first menu among a plurality of menus corresponding to a plurality of language-specific functions is set in response to the input key signal, the controller 50 automatically and interoperably performs language settings for at least one other function based on the language setting made in the first menu. The plurality of menus includes an OSD menu enabling a selectable control of an OSD function, an audio menu enabling a selectable control of an audio function, a caption menu enabling a selectable control of a caption (text) function, and a language-setting menu enabling a selectable control of a prioritization of languages for every function. Thus, the first menu may be any one of the above plurality.

Upon powering the television receiver or whenever a channel is selected for tuning, the tuner 1 tunes a broadcast signal of the corresponding channel and receives the data stream including a plurality of audio signals, a video signal, and additional data specific to the audio and video components. Each language is carried by a dedicated audio signal, and all information of languages provided by the broadcaster is extracted by parsing PSIP information from a currently tuned transport stream. The extracted information is then stored in an internal memory 10. By TP demultiplexing the broadcast signal, the audio and caption/text data can be output according to a pre-selected language while the video data is displayed. Here, the pre-selected language may be a language set for output in a default condition or a language selected by a user via a menu for controlling a selectable and language-specific function of the television receiver.

In the operation of the above apparatus according to the present invention, which is provided in a television receiver having a plurality of language-specific functions, a user may wish to change the setting of an output language of one or more of the functions to a specific setting, such as a newly selected setting or a non-default setting. To do so, that is, to set a specific language or language combination according to each function, the user operates a main menu key provided to the key signal input unit (e.g., remote controller) or the television receiver to select a menu for performing a language setting operation, whereby the stored language information is output by being displayed on the screen of the display unit 70 together with a corresponding audio signal. The displayed information of the languages is represented by displaying the language information for every language, which is the additional information corresponding to languages made available by a current data stream. In other words, the displayed information, which can be displayed according to a selected function menu (OSD menu, audio menu, caption menu, etc.), is information that has been extracted from the tuned broadcast signal rather than a prestored list of languages, e.g., a default language list, so that by selecting a language from the corresponding menu, a program identifier of the selected language is allocated, to thereby enable the audio signal and specially formatted captioning (text), OSD data, and the like to be output in the selected language.

The method of the present invention is performed according to an operation of the controller 50 in response to selections made by a user manipulating the key signal input unit 40 with reference to an output of the display unit 70, which is under the control of the controller. The overall operation of the controller 50 is illustrated in FIG. 2.

Figure 2:
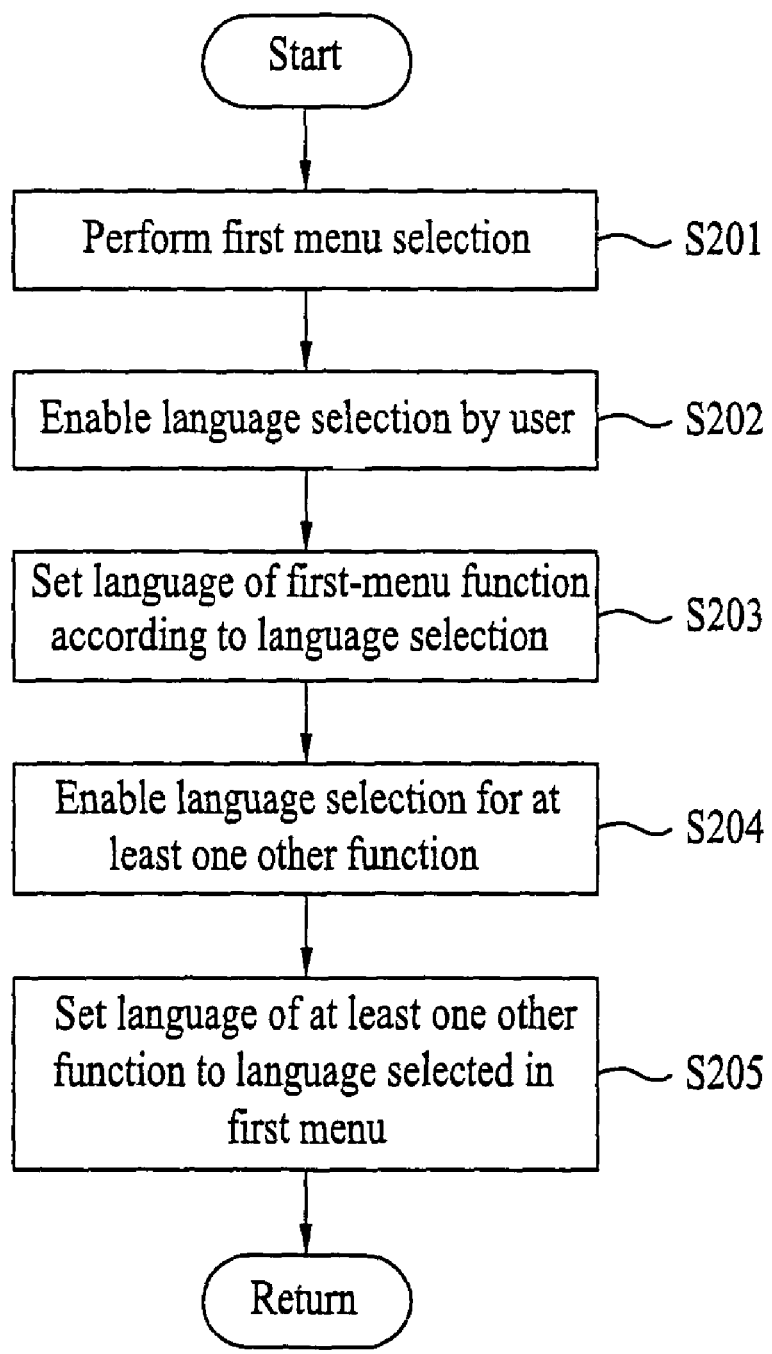
FIG. 2 is a flowchart of the operation of the controller of FIG. 1.

Referring to FIG. 2, a first menu selection is performed by detecting a selection by a user of a specific menu, i.e., a first menu, from a set of menus corresponding to the plurality of language-specific functions provided by a television receiver (S201). Upon detection of a first menu selection, the extracted additional information of the languages being provided by (i.e., present in) a currently received data steam is displayed for user recognition (S202). The user then selects at least one language in the first menu, whereby the language of the first-menu function is set to the selected language or languages (S203). Here, multiple language selections may be made to designate relative priorities. Along with the first-menu language selection, the controller 50 controls the display unit 70 to display menus for at least one other language-specific function based on the first-menu selection (S204). The user then selects at least one other function, whereby the language of the selected at least one other function is set interoperably with the language setting of the first menu (S205). Hence, by one language setting operation performed in a first menu, a language preferred for a plurality of functions can be automatically set.

Thus, the overall operation of the controller 50 as illustrated in FIG. 2 realizes a language setting method according to the present invention, which can be implemented by various embodiments. Exemplary embodiments of the present invention include first, second, and third embodiments, as follows.

First Embodiment

In a language setting method according to the first embodiment of the present invention, by completing a language setting operation to select a language for one of a plurality of functions including, for example, an on-screen display (OSD) function, an audio function, and a caption function, from a corresponding plurality of function menus selectively entered and manipulated by a user, the language setting thus made by the user is simultaneously made for at least one other function, so that the language of the remaining function or functions is automatically and interoperably controlled. Hence, the method according to the first embodiment of the present invention is characterized in providing a function whereby language settings for a plurality of language-specific functions can be automatically achieved by a completion of one language setting operation. That is, if a user sets a language in a first menu corresponding to a first function, e.g., an OSD, audio, or caption function, languages of the remainder of the plurality of functions can selectively be automatically set to the language selected in the first menu, such that the language of the at least one other function is set interoperably with the first menu. Here, the user may opt, using any one of the plurality of function menus, to select an automatic setting for any combination of the plurality of language-specific functions, such that one or more of the plurality of language-specific functions differently interoperates with respect to the language setting in the first menu.

Figure 3A:
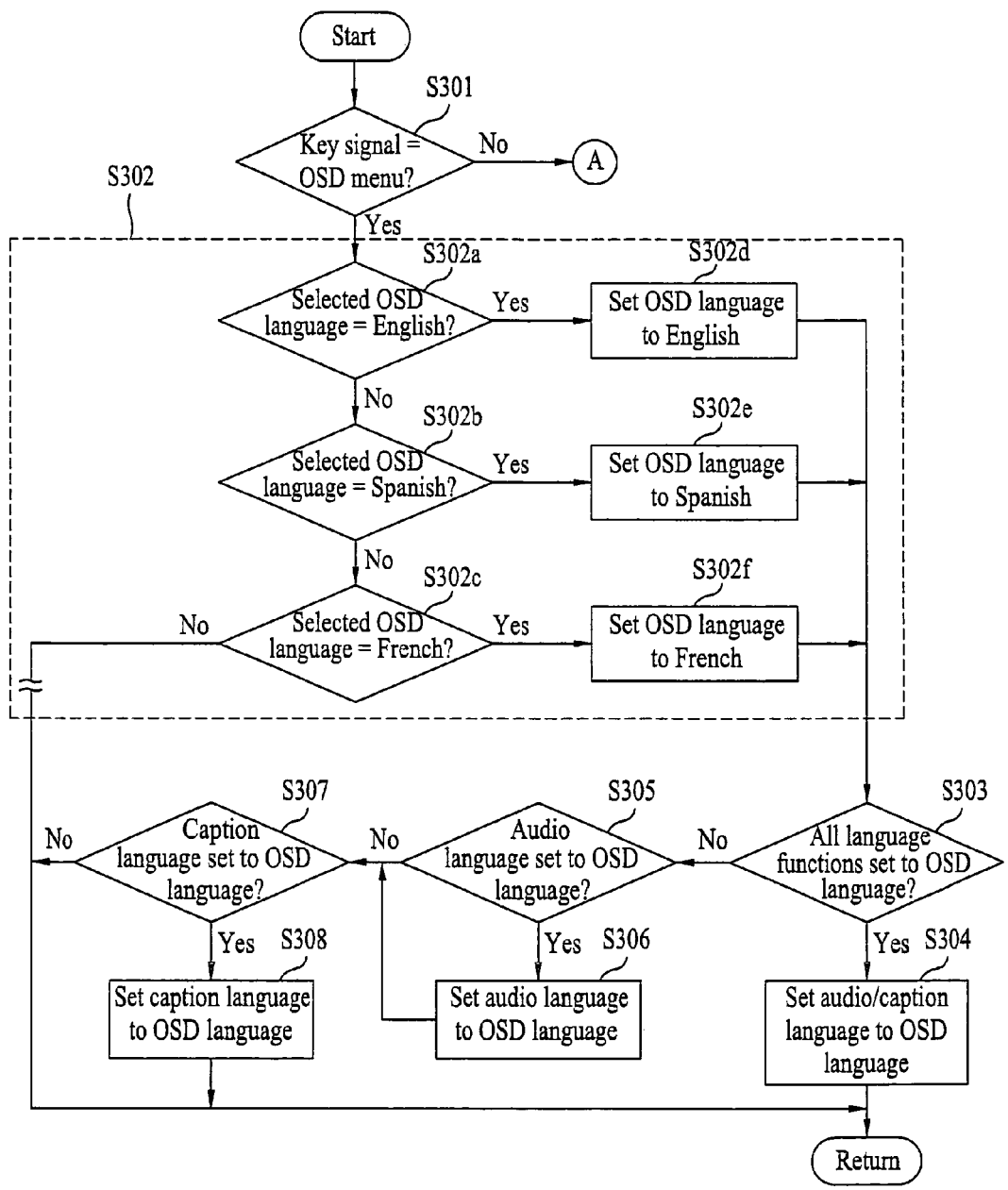
FIGS. 3A-3C are respective sections of a flowchart of a language setting method according to a first embodiment of the present invention.
Figure 3B:
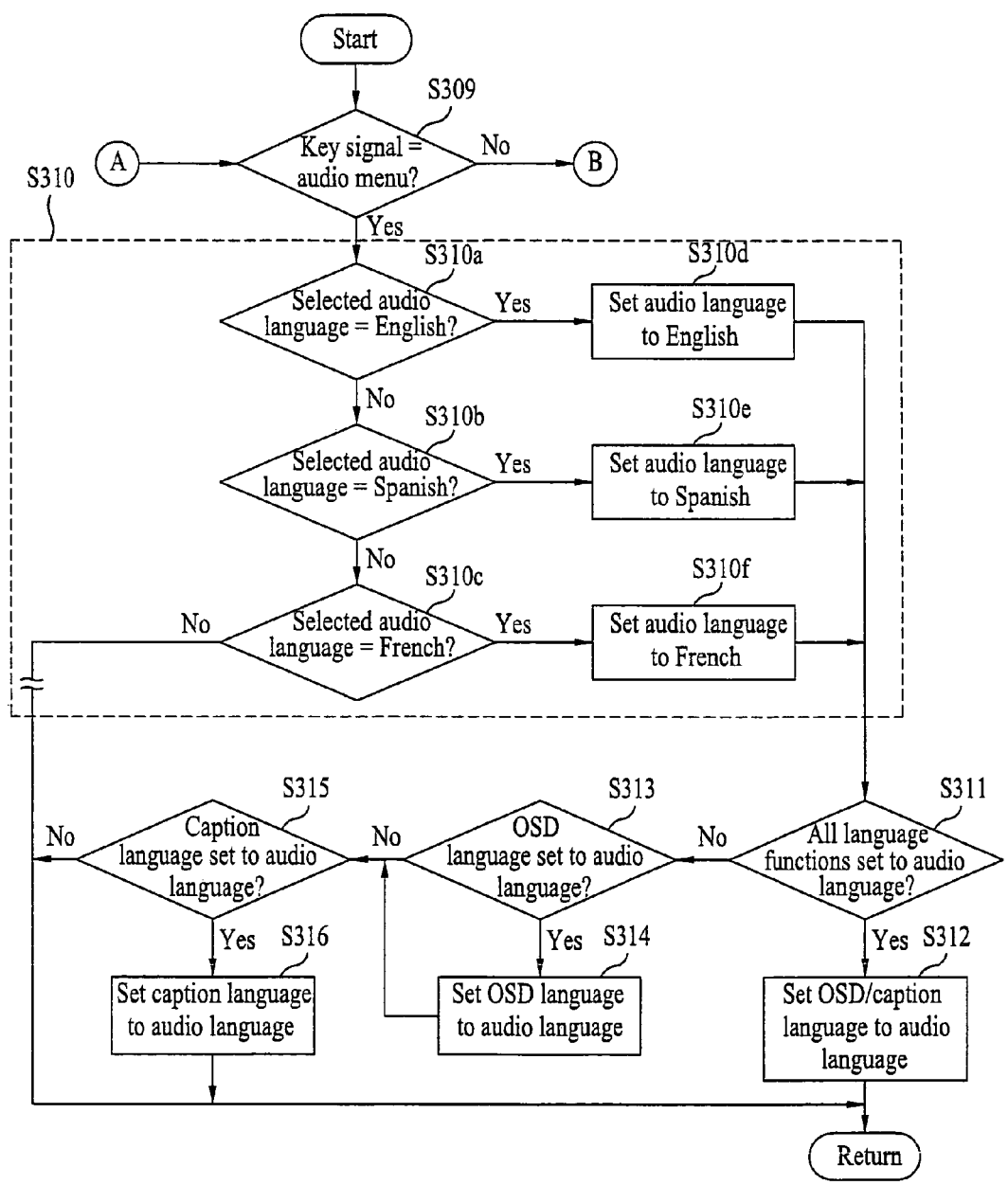
Figure 3C:
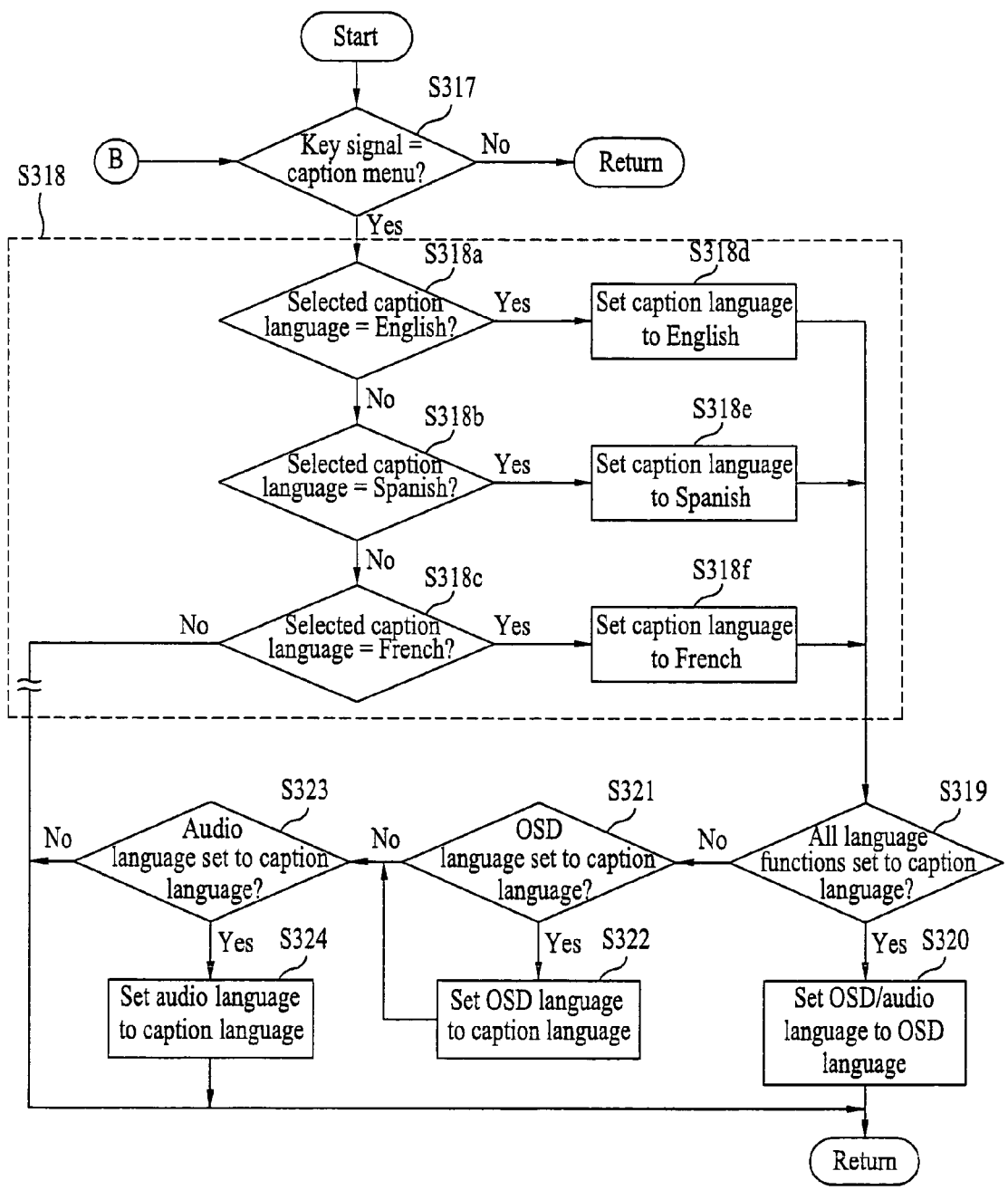
Figure 4A:
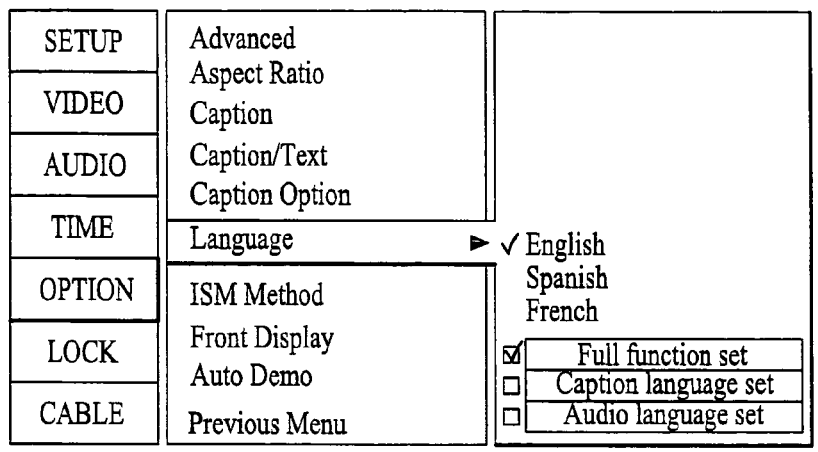
FIG. 4A is a diagram of an exemplary screen image displayed on the display unit of FIG. 1, for setting a language of an OSD function according to the first embodiment.
Figure 4B:
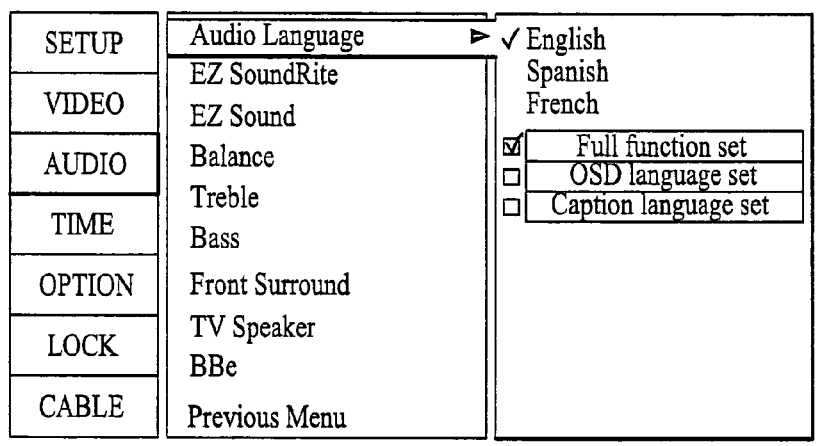
FIG. 4B is a diagram of an exemplary screen image displayed by the display unit of FIG. 1, for setting a language of an audio function according to the first embodiment.
Figure 4C:
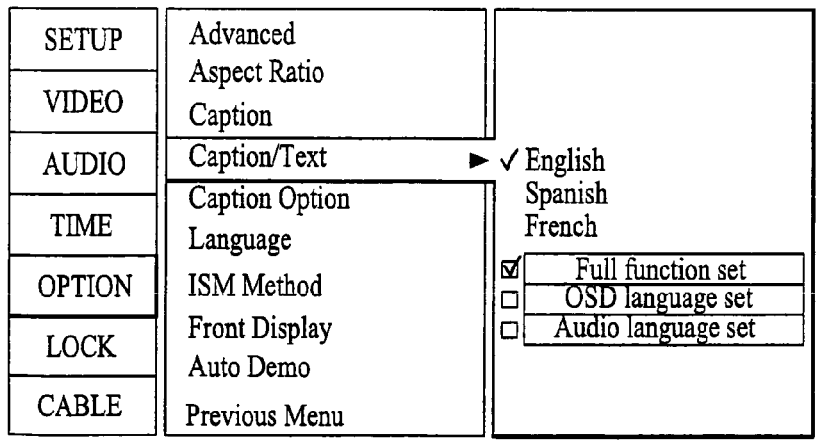
FIG. 4C is a diagram of an exemplary screen image displayed by the display unit of FIG. 1, for setting a language of a caption function according to the first embodiment.

FIGS. 3A-3C illustrate a language setting method according to the first embodiment of the present invention. Meanwhile, FIGS. 4A-4C show exemplary screen images that are selectively displayed on the display unit 70 under the control of the controller 50 per the method of FIGS. 3A-3C, respectively corresponding to an OSD function language setting (FIG. 3A), an audio function language setting (FIG. 3B), and a caption function language setting (FIG. 3C) according to a first embodiment of the present invention. While these are exemplary screen images, it is apparent that various menus and submenus as well as menu items can be devised according to receiver manufacturer.

According to the first embodiment of the present invention, all menus for the control of a television reviver can be displayed on the display unit 70 in the language selected by a user, where a main menu (left) may comprise icons of "SETUP," "VIDEO," "AUDIO," "TIME," "OPTION," "LOCK," and "CABLE" and a first submenu (middle) may comprise icons of "Advanced," "Aspect Ratio," "Caption," "Caption/Text," "Caption Option," "Language," "ISM Method," "Front Display," "Auto Demo," and "Previous Menu" or icons of "Audio Language," "EZ SoundRite," "EZ Sound," "Balance," "Treble," "Bass," "Front Surround," "TV Speaker," "BBe," and "Previous Menu." A second submenu (right) comprises icons for a preferred language setting and for interoperable language-specific functions. The key signal input unit 40 is provided with a main menu key (not shown) and a compliment of arrow keys (not shown), such as up/down and left/right keys, to maneuver between the menus and within each menu and may be provided with an exit or escape key (not shown) to proceed to view the resulting television broadcast signal. During language setting operations, the "Previous Menu" icon may be used to return to a previous menu.

Referring first to FIG. 3A, it is determined whether an input key signal is an OSD menu selection signal (S301). If the OSD menu is selected as the first menu, it is determined whether a language is selected for the OSD function (S302). That is, if any one language is selected in the OSD menu, the specific language as selected is determined as the language of the OSD function, which is then set to the corresponding language. For example, it may be determined whether the selected language is English, French, or Spanish (S302*a*-S302*c*), whereby the OSD language is set according to the selection (S302*d*-S302*f*). Here, it should be appreciated that any number of possible language selections may be provided in the OSD menu, but the flow returns until a selection is made.

Once the OSD language is set, it is determined whether languages of the other functions are to be automatically set according to the selected OSD language (S303). If so, regardless of an earlier setting for another function, e.g., the audio or caption function, the language of each of the audio and caption functions is automatically set to the selected language of the OSD function (S304). Otherwise, settings of the language of each of the audio function and the caption function are checked and set accordingly, namely, based on the selected language of the OSD function. That is, if it is determined that the language setting of the audio function has been selected as the OSD language, the audio language is set accordingly (S305, S306), and if it is determined that the language setting of the caption function has been selected as the OSD language, the caption language is set accordingly (S307, S308). Hence, the languages of one or both of the audio and caption functions may or may not be set to the selected language in the OSD menu.

To set the OSD language, the main menu key of the key signal input unit 40 is operated and then the "OPTION" icon is selected to enter the first submenu, where the "Language" icon is selected. In doing so, the second submenu is entered and a set of selectable language icons corresponding to the step S302 is displayed on the display unit 70, and a language setting operation is performed by manipulating the key signal input unit 40 to set the language of the OSD function. At the same time, icons corresponding to the steps S303, S305, and S307 are also displayed, and by selecting one or more of these icons, the user can simultaneously and interoperably determine one or both of the audio and caption languages based on the selected language of the OSD function.

Meanwhile, referring to FIG. 3B, it is determined whether an input key signal is an audio menu selection signal (S309). If the audio menu is selected as the first menu, it is determined whether a language is selected for the audio function (S310). That is, if any one language is selected in the audio menu, the specific language as selected is determined as the language of the audio function, which is then set to the corresponding language. For example, it may be determined whether the selected language is English, French, or Spanish (S310*a*-S310*c*), whereby the audio language is set according to the selection (S310*d*-S310*f*). Here, it should be appreciated that any number of possible language selections may be provided in the audio menu, but the flow returns until a selection is made.

Once the audio language is set, it is determined whether languages of the other functions are to be automatically set according to the selected audio language (S311). If so, regardless of an earlier setting for another function, e.g., the OSD or caption function, the language of each of the OSD and caption functions is automatically set to the selected language of the audio function (S312). Otherwise, settings of the language of each of the OSD function and the caption function are checked and set accordingly, namely, based on the selected language of the audio function. That is, if it is determined that the language setting of the OSD function has been selected as the audio language, the OSD language is set accordingly (S313, S314), and if it is determined that the language setting of the caption function has been selected as the audio language, the caption language is set accordingly (S315, S316). Hence, the languages of one or both of the OSD and caption functions may or may not be set to the language selected in the audio menu.

To set the audio language, the main menu key of the key signal input unit 40 is operated and then the "AUDIO" icon is selected to enter the first submenu, where the "Audio Language" icon is selected. In doing so, the second submenu is entered and a set of selectable language icons corresponding to the step S310 is displayed on the display unit 70, and a language setting operation is performed by manipulating the key signal input unit 40 to set the language of the audio function. At the same time, icons corresponding to the steps S311, S313, and S315 are also displayed, and by selecting one or more of these icons, the user can simultaneously and interoperably determine one or both of the OSD and caption languages based on the selected language of the audio function. It should be appreciated that the above audio function selection is enabled if a broadcasting station substantially provides a digital broadcast signal of a data stream format, so that a language other than a default language may be selected as the language of the audio function.

Meanwhile, referring to FIG. 3C, it is determined whether an input key signal is a caption menu selection signal (S317). If the caption menu is selected as the first menu, it is determined whether a language is selected for the caption function (S318). That is, if any one language is selected in the caption menu, the specific language as selected is determined as the language of the caption function, which is then set to the corresponding language. For example, it may be determined whether the selected language is English, French, or Spanish (S318a-S318c), whereby the caption language is set according to the selection (S318d-S318f). Here, it should be appreciated that any number of possible language selections may be provided in the caption menu, but the flow returns until a election is made.

Once the caption language is set, it is determined whether languages of the other functions are to be automatically set according to the selected caption language (S319). If so, regardless of an earlier setting for another function, e.g., the OSD or audio function, the language of each of the OSD and audio functions is automatically set to the selected language of the caption function (S320). Otherwise, settings of the language of each of the OSD function and the audio function are checked and set accordingly, namely, based on the selected language of the caption function. That is, if it is determined that the language setting of the OSD function has been selected as the caption language, the OSD language is set accordingly (S321, S322), and if it is determined that the language setting of the audio function has been selected as the caption language, the audio language is set accordingly (S323, S324). Hence, the languages of one or both of the OSD and audio functions may or may not be set to the language selected in the caption menu.

To set the caption language, the main menu key of the key signal input unit 40 is operated and then the "OPTION" icon is selected to enter the first submenu, where the "Caption/Text" icon is selected. In doing so, the second submenu is entered and a set of selectable language icons corresponding to the step S318 is displayed on the display unit 70, and a language setting operation is performed by manipulating the key signal input unit 40 to set the language of the caption function. At the same time, icons corresponding to the steps S319, S321, and S323 are also displayed, and by selecting one or more of these icons, the user can simultaneously and interoperably determine one or both of the OSD and audio languages based on the selected language of the caption function. It should be appreciated that the above caption function selection is enabled if a broadcasting station substantially provides a digital broadcast signal of a data stream format, so that a language other than a default language may be selected as the language of the caption function.

Second Embodiment

Figure 5:
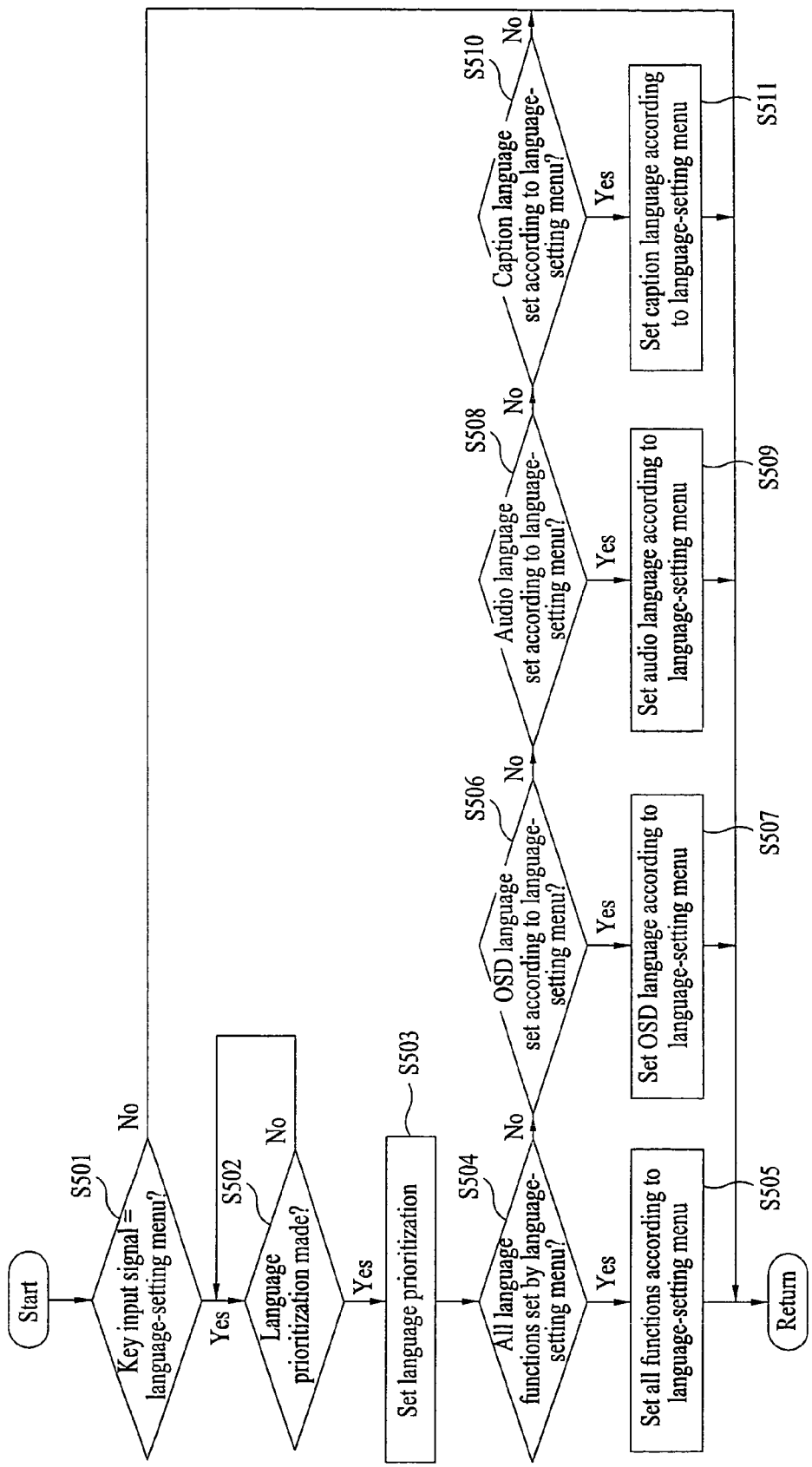
FIG. 5 is flowchart of a language setting method according to a second embodiment of the present invention.
Figure 7:
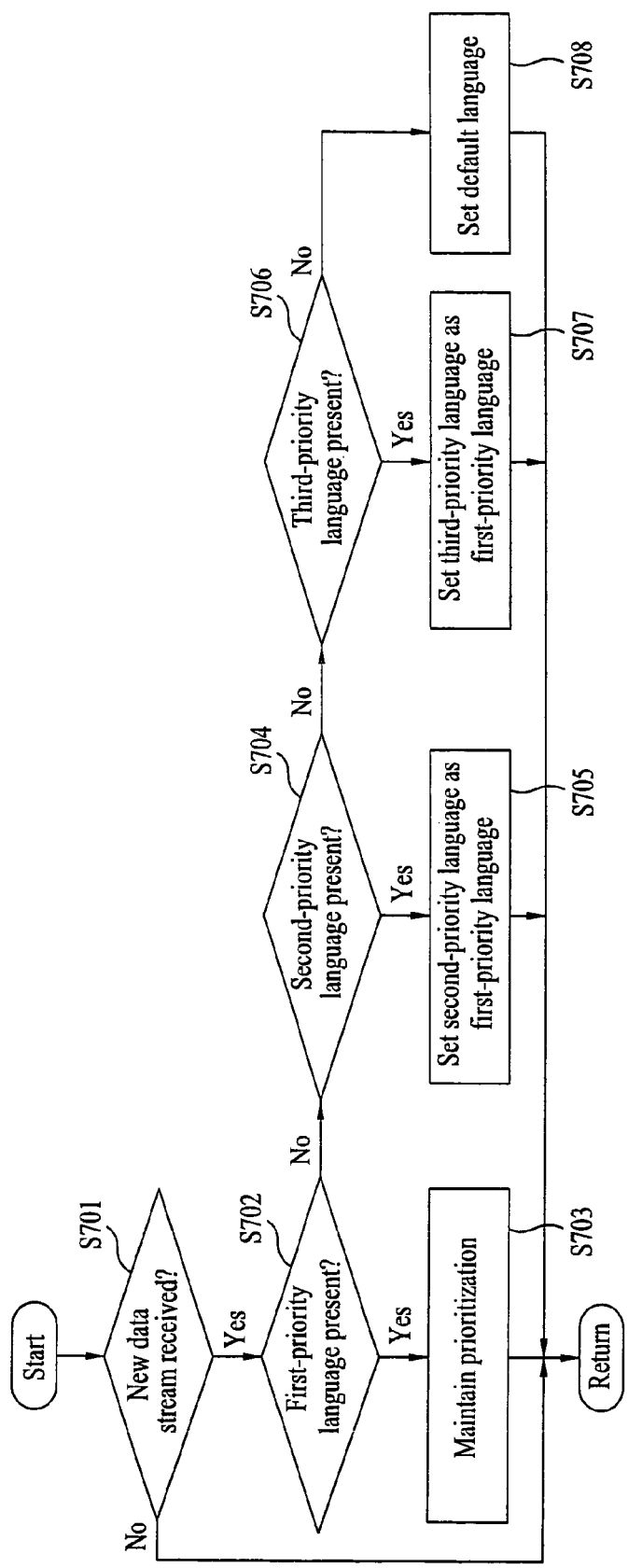
FIG. 7 is flowchart of a language availability verification and compensation program executed by the method of each of the second and third embodiments.

FIG. 5 illustrates a language setting method according to the second embodiment of the present invention, which utilizes the process of FIG. 7. Meanwhile, FIG. 6 shows an exemplary screen image displayed on the display unit 70 under the control of the controller 50 per the method of FIG. 5. While this an exemplary screen image, it is apparent that various menus and submenus as well as menu items can be devised according to receiver manufacturer.

According to the second embodiment of the present invention, in addition to the features of the first embodiment, including icons displayed by the display unit 70 under the control of the controller 50 and keys provided to the key signal input unit 40, a language-setting menu "LANGUAGE" is further provided to the main menu. Here, a first submenu comprises icons for a prioritized language setting as well as those for the automatically interoperable language-specific functions, and a second submenu is unnecessary. Thus, the language-setting menu is a first menu that is formatted to enable a user-selectable designation of relative priorities for each of at least two languages. Once the priority designation is made, at least one other function can be selected to be automatically and interoperably set according to the prioritization, whereby languages of one or more of the OSD, audio, and caption functions are automatically set in accordance with the designated priority and are automatically reset if the priority language is not present in an input data stream, i.e., a currently received broadcast signal.

Referring to FIG. 5, it is determined whether an input key signal is a language-setting menu selection signal (S501). If the language-setting menu is selected as the first menu, a set of languages is prioritized, for example, according to a descending preference of the user. In this embodiment, where three languages (i.e., English, Spanish, and French) are exemplified, the languages are arranged by the user according to priority, namely, English as a first priority, French as a second priority, and Spanish as a third priority (S502). This priority selection may be left incomplete (e.g., fewer than three) by the user as long as one priority language is designated, and it should be appreciated that a priority may be designated to more than three languages if more languages have been extracted from the data stream. The respective language priorities are set according to the user selection (S503).

Once language priorities are set as above, it is determined whether languages of all functions are to be automatically set according to the selected caption language (S504). If so, regardless of an earlier setting for any function, e.g., the OSD, audio, or caption function, the language of each function is automatically set to a prioritized language as selected in the language-setting menu (S505). Otherwise, settings of the language of each function are checked and set accordingly, namely, based on the selected prioritization. That is, if it is determined that the language of the OSD function has been set to the prioritized language of the language-setting menu, the OSD language is set accordingly (S506, S507), and if it is determined that the language of the audio function has been set to the prioritized language of the language-setting menu, the audio language is set accordingly (S508, S509); and if it is determined that the language of the caption function has been set to the prioritized language of the language-setting menu, the caption language is set accordingly (S510, S511). Hence, the languages of any one or all of a set of language-specific functions may or may not be set based on a language as prioritized in the language-setting menu.

To set language priorities, the main menu key of the key signal input unit 40 is operated and then the "LANGUAGE" icon is selected to enter the first submenu, whereupon a set of selectable language icons corresponding to the step S502 is displayed on the display unit 70, and the language prioritization is then performed by manipulating the key signal input unit 40. At the same time, icons corresponding to the steps S504, S506, S508, and S510 are also displayed, and by selecting one or more of these icons, the user can simultaneously and interoperably determine a language priority for any or all of the language-specific functions based on the selected prioritization. It should be appreciated that language-setting prioritization is enabled if a broadcasting station substantially provides a digital broadcast signal of a data stream format, so that a language other than a default language may be selected according to priority.

With respect to FIG. 7, since there may be occasions when a specific data stream transmitted from a tuned broadcasting channel is missing one or more of the prioritized languages, a language availability verification and compensation program is executed by the controller 50. This program is executed at predetermined times, repeatedly, for example, each time a new broadcast signal is tuned or at the beginning of a broadcast program. In doing so, it is first determined if a new data stream is present, whereupon language information is extracted and parsed for a display enabling the language setting steps of the second and third embodiments (S701). Then, by parsing the data stream, it is determined whether the data stream contains an audio signal corresponding to each language of the priorities set in the method FIG. 5. That is, if the data stream contains an audio signal corresponding to the language of the first priority (e.g., English), the set prioritization is maintained (S702, S703). If the language of the first priority is absent from the data stream, it is determined whether any of the languages (e.g., French or Spanish) of the remaining priorities are present in the data stream, and the language of the next-lower priority is set. For example, if the data stream contains an audio signal corresponding to the language of the second priority, but not the language of the first priority, the second priority language is set as the first priority (S704, S705) and the remaining priorities are rearranged (reset) accordingly, and if the data stream contains an audio signal corresponding to the language of the third priority, but not the language of either the first or second priority, the third priority language is set as the first priority (S706, S707) and the remaining priorities are rearranged accordingly. In the event that the new data stream contains none of the prioritized languages, a default language will be set (S708).

Third Embodiment

Figure 8A:
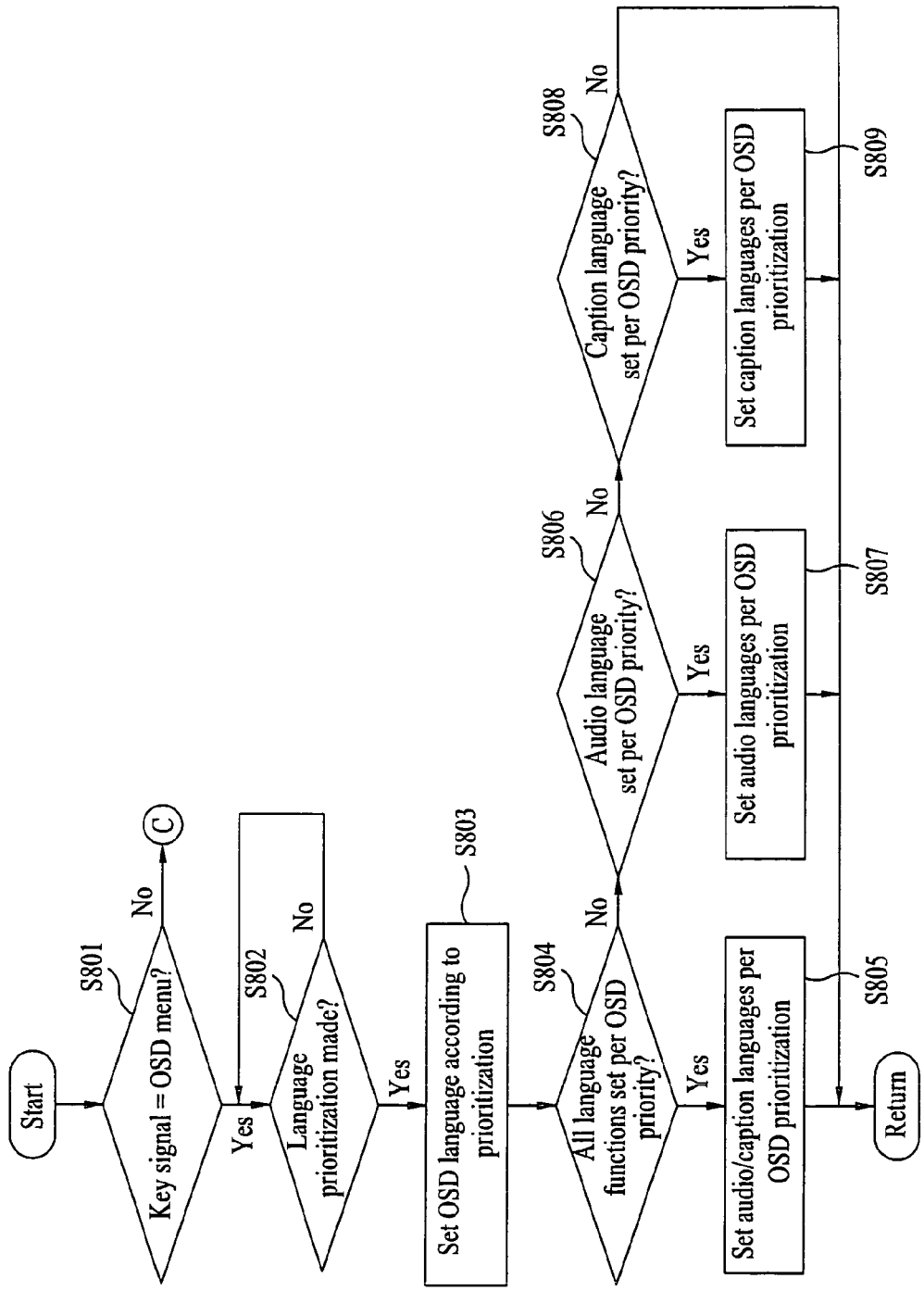
FIGS. 8A-8C are respective sections of a flowchart of a language setting method according to a third embodiment of the present invention.
Figure 8B:
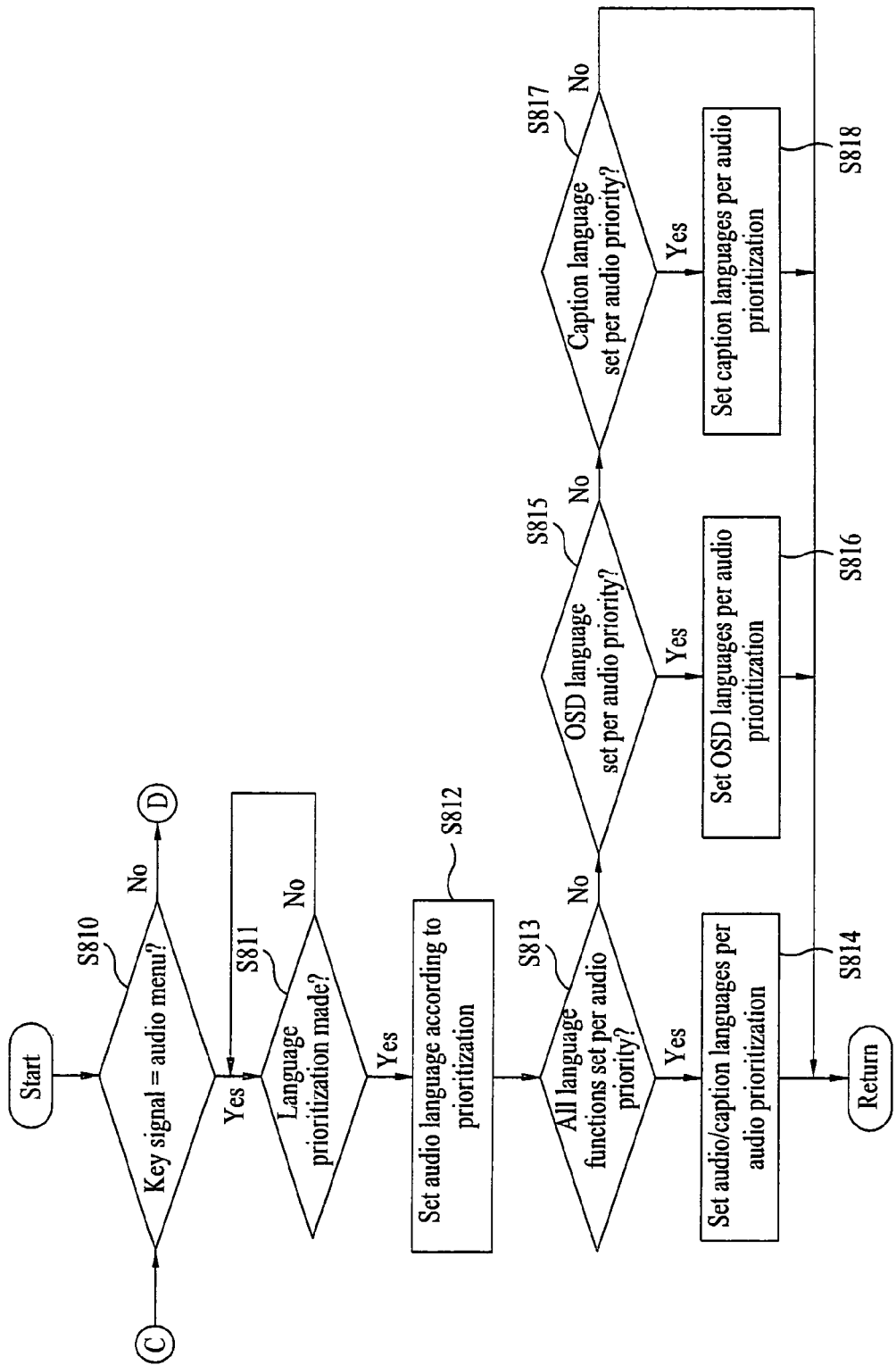
Figure 8C:
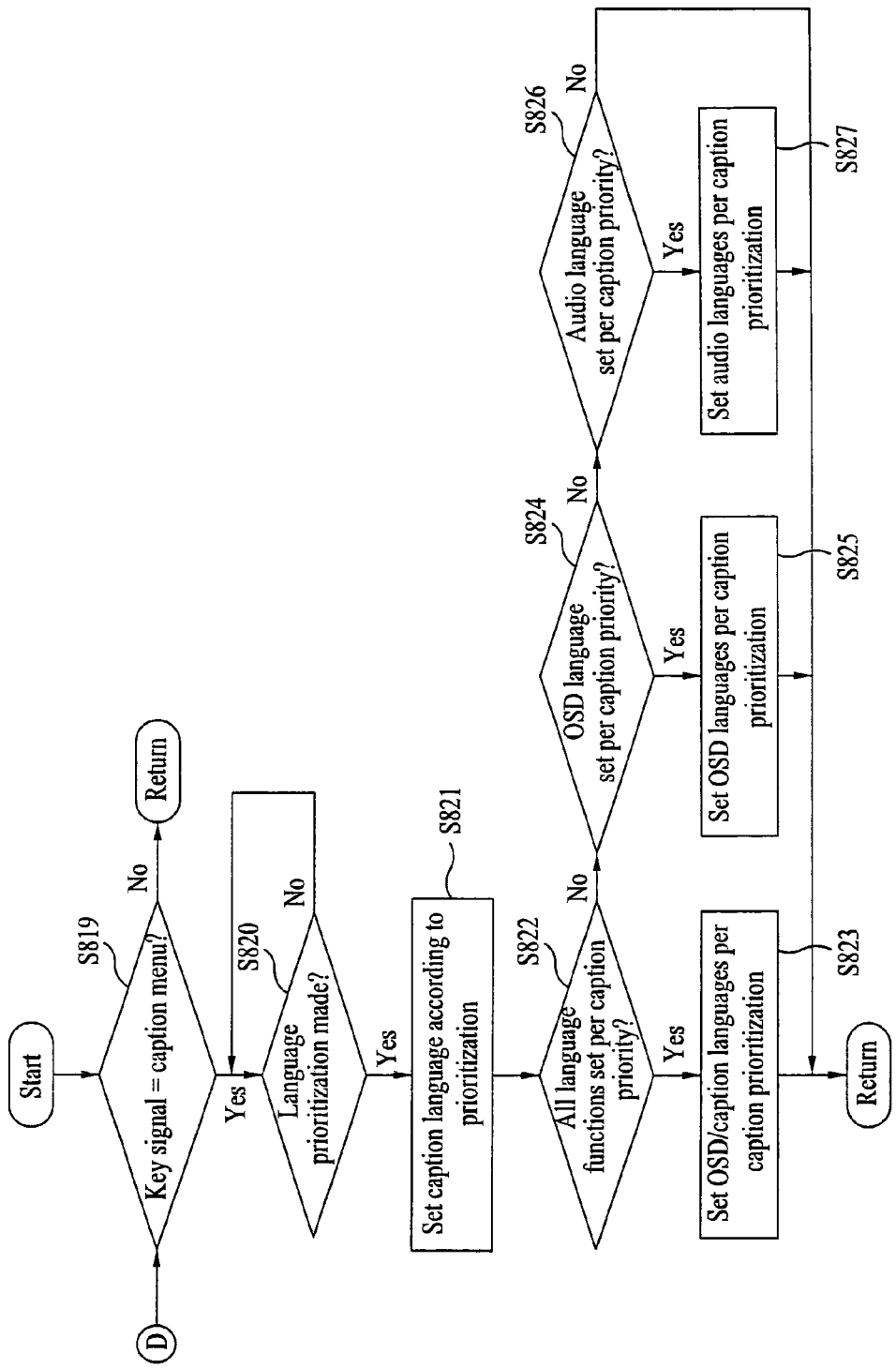
Figure 9A:
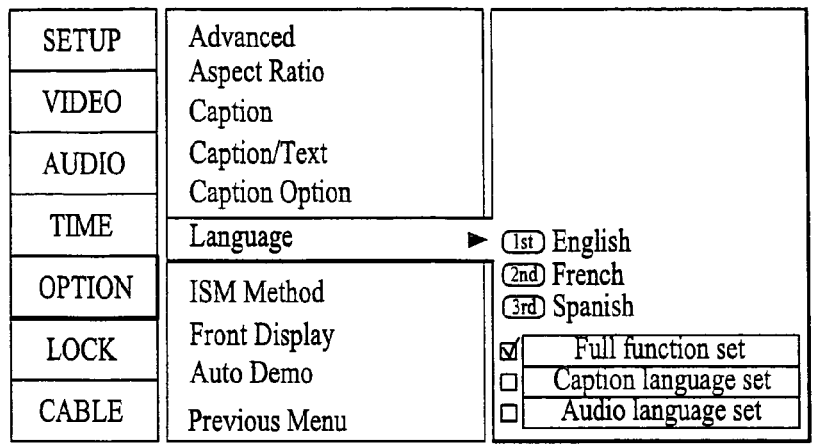
FIG. 9A is a diagram of an exemplary screen image displayed by the display unit of FIG. 1, for setting a language of an OSD function according to the third embodiment.
Figure 9B:
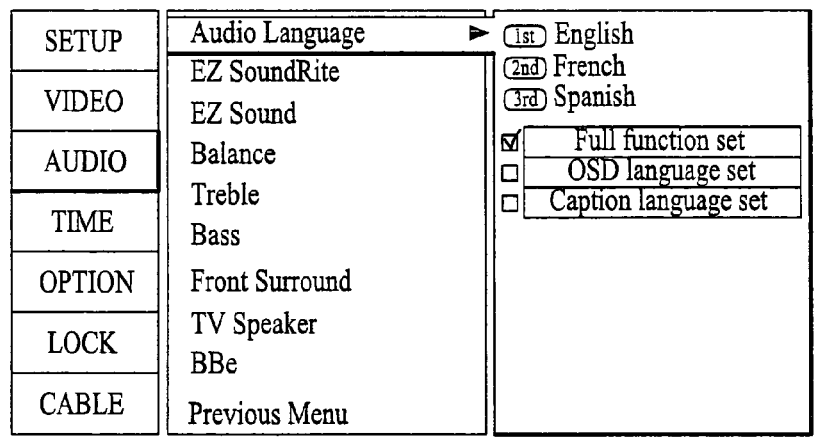
FIG. 9B is a diagram of an exemplary screen image displayed by the display unit of FIG. 1, for setting a language of an audio function according to the third embodiment.
Figure 9C:
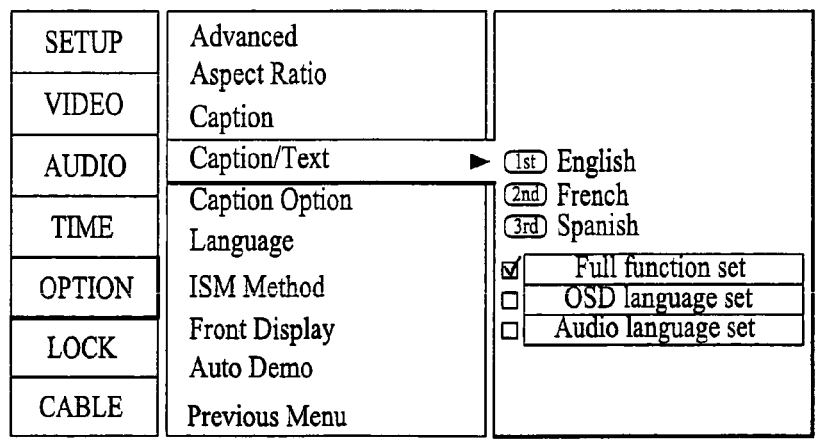
FIG. 9C is a diagram of an exemplary screen image displayed by the display unit of FIG. 1, for setting a language of a caption function according to the third embodiment.

FIGS. 8A-3C illustrate a language setting method according to the third embodiment of the present invention, which utilizes the process of FIG. 7, and FIGS. 9A-9C show exemplary screen images that are selectively displayed on the display unit 70 under the control of the controller 50 per the method of FIGS. 8A-8C, respectively corresponding to an OSD function language setting (FIG. 8A), an audio function language setting (FIG. 8B), and a caption function language setting (FIG. 8C) according to a first embodiment of the present invention. Thus, the third embodiment of the present invention is based on a combination of the first and second embodiments.

Referring first to FIG. 8A, it is determined whether an input key signal is an OSD menu selection signal (S801). If the OSD menu is selected as the first menu, it is determined whether a language prioritization is made by a user selection as in the second embodiment, whereupon the respective language priorities are set according to the user selection (S802, S803). Once the OSD language priority is set, it is determined whether languages of the other functions are to be automatically set according to the prioritization made for the OSD function (S804). If so, regardless of an earlier setting for another function, e.g., the audio or caption function, the language prioritization of each of the audio and caption functions is automatically set to that of the OSD function (S805). Otherwise, language priority preferences of each of the audio function and the caption function are checked and set accordingly, namely, based on the selected prioritization of the OSD function. That is, if it is determined that the audio function language is to be set per the OSD priority, the audio language is set accordingly (S806, S807), and if it is determined that the caption function language is to be set per the OSD priority, the caption language is set accordingly (S808, S809). Hence, the prioritizations of one or both of the audio and caption functions may or may not be set per the prioritization selected in the OSD menu.

Meanwhile, referring to FIG. 8B, it is determined whether an input key signal is an audio menu selection signal (S810). If the audio menu is selected as the first menu, it is determined whether a language prioritization is made by a user selection as in the second embodiment, whereupon the respective language priorities are set according to the user selection (S811, S812). Once the audio language priority is set, it is determined whether languages of the other functions are to be automatically set according to the prioritization made for the audio function (S813). If so, regardless of an earlier setting for another function, e.g., the OSD or caption function, the language prioritization of each of the OSD and caption functions is automatically set to that of the audio function (S814). Otherwise, language priority preferences of each of the OSD function and the caption function are checked and set accordingly, namely, based on the selected prioritization of the audio function. That is, if it is determined that the OSD function language is to be set per the audio priority, the OSD language is set accordingly (S815, S816), and if it is determined that the caption function language is to be set per the audio priority, the caption language is set accordingly (S818, S818). Hence, the prioritizations of one or both of the OSD and caption functions may or may not be set per the prioritization selected in the audio menu.

Meanwhile, referring to FIG. 8C, it is determined whether an input key signal is a caption menu selection signal (S819). If the caption menu is selected as the first menu, it is determined whether a language prioritization is made by a user selection as in the second embodiment, whereupon the respective language priorities are set according to the user selection (S820, S821). Once the caption language priority is set, it is determined whether languages of the other functions are to be automatically set according to the prioritization made for the caption function (S822). If so, regardless of an earlier setting for another function, e.g., the OSD or audio function, the language prioritization of each of the OSD and audio functions is automatically set to that of the caption function (S823). Otherwise, language priority preferences of each of the OSD function and the audio function are checked and set accordingly, namely, based on the selected prioritization of the caption function. That is, if it is determined that the OSD function language is to be set per the caption priority, the OSD language is set accordingly (S824, S825), and if it is determined that the audio function language is to be set per the caption priority, the audio language is set accordingly (S826, S827). Hence, the prioritizations of one or both of the OSD and audio functions may or may not be set per the prioritization selected in the caption menu.

By adopting the method and apparatus according to the present invention, the language setting necessary for a digital television receiver having a plurality of language-specific functions can be simply and conveniently performed according to user preference. Moreover, a current broadcast program can be viewed using a specific language, according to a user preference, by fully utilizing a plurality of languages as currently provided by the broadcaster.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A method of setting languages in a television receiver, the method comprising:
    setting a language in a first menu according to a user selection, the first menu corresponding to one function of a plurality of language-specific functions; and
    automatically setting a language of at least one other function of the plurality of language-specific functions to the language set according to the user selection,
    wherein the first menu includes a second submenu having icons displayed for interoperable language-specific functions.

2. The method of claim 1, further comprising:
    designating, according to the user selection, a full language setting for simultaneously setting languages of a remainder of the plurality of language-specific functions, the language of the remainder functions being set interoperably with the first menu.

3. The method of claim 1, further comprising:
    designating, according to the user selection, at least one function setting for simultaneously setting languages of at least one function of the plurality of language-specific functions, the language of the at least one function being set interoperably with the first menu.

4. The method of claim 1, wherein the plurality of language-specific functions includes an on-screen display (OSD) function, an audio function, and a caption function.

5. The method of claim 4, wherein the plurality of language-specific functions further includes a full language setting for simultaneously selecting each of the OSD function, the audio function, and the caption function.

6. The method of claim 4, wherein the first menu is selectable from a plurality of menus for setting a language for each of the OSD function, the audio function, and the caption function.

7. The method of claim 6, wherein the first menu corresponds to one selected from the group consisting of the OSD function menu, the audio function menu, and the caption function menu, and wherein the at least one other function corresponds to a set of menus including at least one of a remainder of the group.

8. The method of claim 1, further comprising:
    extracting language information from a tuned transport stream by parsing additional information from the tuned transport stream;
    storing the extracted language information in a memory; and
    outputting the stored information to enable the user selection.

9. The method of claim 8, wherein said outputting comprises:
    simultaneously outputting the stored language information as an audio signal and as an image displayed on a screen.

10. A method of setting languages in a television receiver, the method comprising:
    setting at least two languages in a first menu according to a user selection, the first menu corresponding to one function of a plurality of language-specific functions, said setting of the at least two languages designating a priority of each of the at least two languages; and
    automatically setting a language of at least one other function of the plurality of language-specific functions to the language set according to the user selection,
    wherein the first menu includes a second submenu having icons displayed for interoperable language-specific functions.

11. The method of claim 10, further comprising:
    determining whether a language of a first priority of the designated priorities is present in a currently received transport stream.

12. The method of claim 11, further comprising:
    resetting the set languages of the at least one other function to the language of a next-lower priority, if it is determined that the first-priority language is not present in the currently received transport stream.

13. The method of claim 10, further comprising:
    designating, according to the user selection, a full language setting for simultaneously setting languages of a remainder of the plurality of language-specific functions, the language of the remainder functions being set interoperably with the first menu.

14. The method of claim 10, further comprising:
    designating, according to the user selection, at least one function setting for simultaneously setting languages of at least one function of the plurality of language-specific functions, the language of the at least one function being set interoperably with the first menu.

15. The method of claim 10, wherein the plurality of language-specific functions includes an on-screen display (OSD) function, an audio function, and a caption function.

16. The method of claim 15, wherein the plurality of language-specific functions further includes a full language setting for simultaneously selecting each of the OSD function, the audio function, and the caption function.

17. The method of claim 16, wherein the full language setting designates the priority of each of the at least two languages.

18. The method of claim 15, wherein the first menu is selectable from a plurality of menus for priority designation and for setting a language for each of the OSD function, the audio function, and the caption function.

19. The method of claim 18, wherein the first menu corresponds to the priority designation, and wherein the at least one other function corresponds to a set of menus including at least one selected from the group consisting of the OSD function menu, the audio function menu, and the caption function menu.

20. The method of claim 10, further comprising:
  extracting language information from a tuned transport stream by parsing additional information from the tuned transport stream;
  storing the extracted language information in a memory; and
  outputting the stored information to enable the user selection.

21. The method of claim 20, wherein said outputting comprises:
  simultaneously outputting the stored language information as an audio signal and as an image displayed on a screen.

22. An apparatus for setting languages in a television receiver, the apparatus comprising:
  a key signal input unit for generating, according to a user selection, a key signal for a menu selection and a language selection;
  a display unit for generating, in response to the key signal, screen images for the menu selection and the language selection; and
  a controller for automatically setting, if a language in a first menu corresponding to one function of a plurality of language-specific functions is set by the user selection, a language of at least one other function of the plurality of language-specific functions to the language set by the user selection, the language of the at least one other function being set interoperably with the first menu,
  wherein the first menu includes a second submenu having icons displayed for interoperable language-specific functions.

23. The apparatus of claim 22, wherein the plurality of language-specific functions includes an on-screen display (OSD) function, an audio function, and a caption function.

24. The apparatus of claim 23, wherein the first menu is selectable from a plurality of menus for setting a language for each of the OSD function, the audio function, and the caption function.

25. The apparatus of claim 24, wherein the first menu corresponds to one selected from the group consisting of the OSD function menu, the audio function menu, and the caption function menu, and wherein the at least one other function corresponds to a set of menus including at least one of the remainder of the group.

26. The apparatus of claim 22, wherein the user selection in the first menu sets at least two languages by designating a priority of each of the at least two languages.

27. The apparatus of claim 26, wherein the plurality of language-specific functions includes an on-screen display (OSD) function, an audio function, and a caption function.

28. The apparatus of claim 27, wherein the first menu is selectable from a plurality of menus for priority designation and for setting a language for each of the OSD function, the audio function, and the caption function.

29. The apparatus of claim 28, wherein the first menu corresponds to the priority designation, and wherein the at least one other function corresponds to a set of menus including at least one selected from the group consisting of the OSD function menu, the audio function menu, and the caption function menu.

30. The apparatus of claim 22, further comprising:
  a memory for storing language information extracted from a tuned transport stream input to the television receiver, the language information being stored according to a parsing of additional information from the tuned transport stream.

* * * * *